Jan. 26, 1965   J. L. JOHNSON   3,167,352
CHAIR WITH A UNITARY SUSPENDED SEAT AND BACKREST
Filed Jan. 27, 1964   2 Sheets-Sheet 1
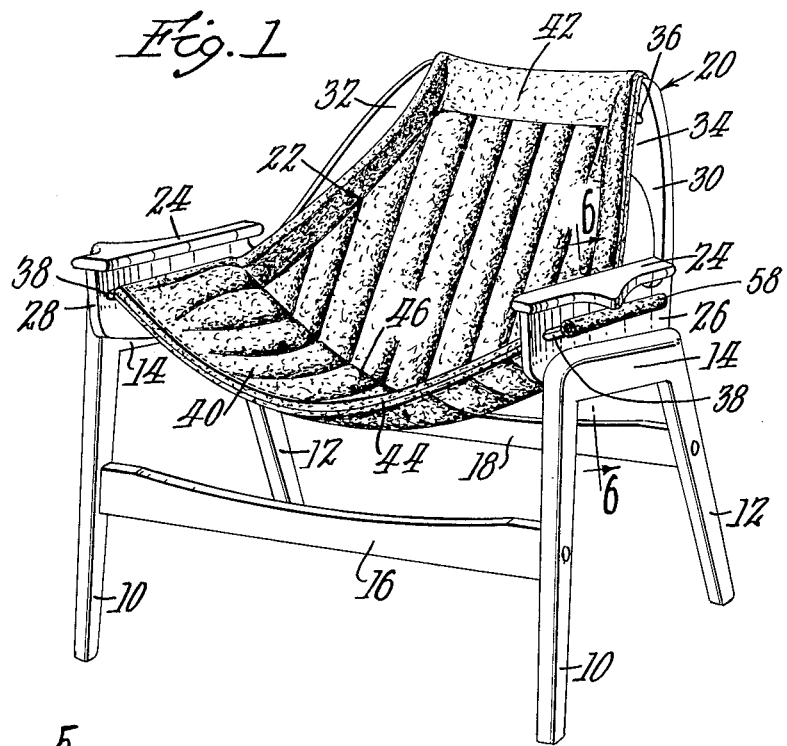
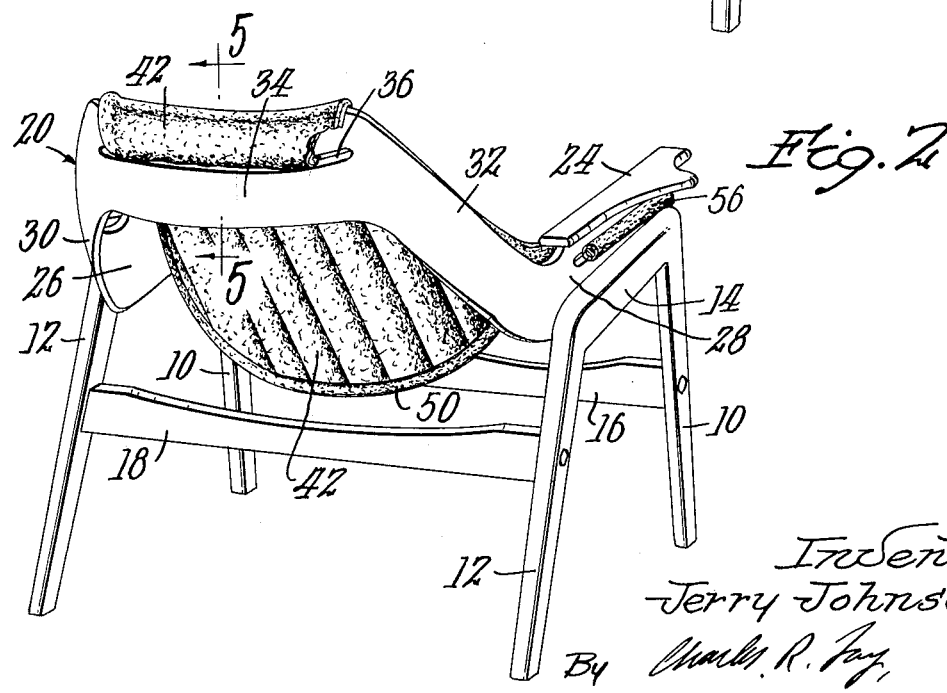
Inventor
Jerry Johnson
By Charles R. Fay,
Attorney United States Patent Office 3,167,352
Patented Jan. 26, 1965

3,167,352
CHAIR WITH A UNITARY SUSPENDED SEAT
AND BACKREST
Jerry L. Johnson, Malibu, Calif., assignor to Charlton
Company, Inc., Fitchburg, Mass., a corporation of
Massachusetts
Filed Jan. 27, 1964, Ser. No. 340,181
7 Claims. (Cl. 297—445)

This invention relates to a new and improved seat construction which may be in the form of a chair, love seat, settee, etc., the principal object of which resides in the provision of a one-piece molded frame including an armrest portion and a back portion which can be supported on legs as desired, and which is provided with means suspending a one-piece unitary seat and backrest of flexible material. The seat and backrest unit is provided with three spaced hems or the like, one at the top of the backrest portion and the other on the sides of the seat portion, these hems being thrust through appropriate openings in the molded frame above described and receiving rods or dowels slightly larger than the slots, thus holding the flexible seat and backrest unit suspended from said frame. The seat hems are associated with the arms of the molded frame, and the third hem is associated with the back portion of the frame, the seat and backrest unit depending solely from the frame at these three supports and not being in contact or associated with any other part of the entire structure.

Further objects of the invention include the provision of a novel seating arrangement including a completely flexible seat and backrest unit providing a very comfortable support for the occupant which is supported by a single-piece molded armrest and back frame which may be of metal, molded plywood, etc., further in combination with means for supporting the same in spaced relation with respect to the floor so as to suspend the flexible seat and backrest unit above the floor.

Other objects and advantages of the invention will appear hereinafter.

Reference is to be had to the accompanying drawings, in which:

FIG. 1 is a front perspective view showing the new construction;

FIG. 2 is a rear perspective view thereof;

Figure 3:
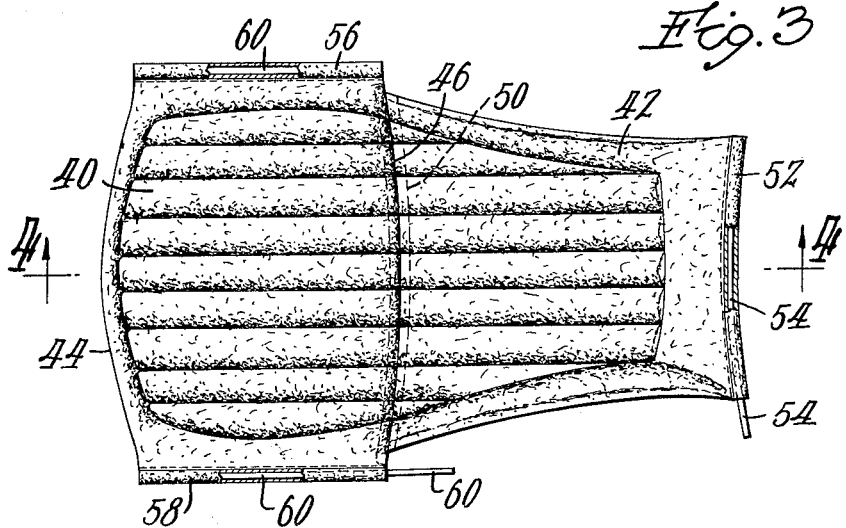
FIG. 3 is a top plan view.

In illustrating the invention the same is shown as applied to a chair. This chair may be provided with any kind of legs desired but in the present case there are shown the front legs 10 and rear legs 12, each front leg being connected by a member 14 to a rear leg. The front legs are connected by a cross brace 16 and the rear legs by a somewhat similar cross brace 18.

The remainder of the chair comprises two main parts, one of which is a unitary, integral armrest and back frame member which is generally indicated by the reference numeral 20; and the other part is the flexible combined seat and backrest unit indicated generally by the reference numeral 22. The frame member 20 is in a single piece except for the actual armrests 24, 24 which may be applied in any way desired, and includes the two portions 26, 28, extending from a point slightly forwardly of front legs 10 in a generally straight line to the rear of the seat, and at the rear of the seat they extend in upwardly and inwardly directed curved portions which are indicated at 30 and 32.

The inwardly directed curved portions 30 and 32 are connected by a back portion indicated at 34. It is to be understood that the parts 26, 28, 30, 32 and 34 are all one single formed or molded member on the arm portions 26 and 28 of which the armrests 24 can be attached as shown, the arm units 26, 28 being then attachable by any kind of fastening means desired to the members 14 which connect the front and rear legs.

The back portion 34 which forms a part of the frame 20 is provided with a generally horizontal slot 36. The back portion 34 may be curved as shown in FIG. 3 to provide a form-fitting support and thus the slot 36 is likewise curved. Each arm portion 26, 28 is provided with a longitudinal horizontal slot therein, these being indicated at 38, and as shown extending front to rear.

The flexible seat and backrest unit comprises two main portions which are a seat portion 40 and a backrest portion 42. These may be made of any suitable material such as fabrics, plastics, laminated fabric, foam, etc. The seat portion may be provided with a convex curve at the forward edge 44 thereof although this particular conformation is not necessary. However at its rear edge it is provided with a convex edge 46 which matches a concave edge at the bottom of the backrest portion 42 and the seat 40 and backrest 42 are connected together along this line. This gives a predetermined desired shape to the combined unit 40, 43 which not only makes the backrest relatively form-fitting but also forms a support at the rear edge of the seat portion where it joins with the backrest so that when a person sits in the chair it is extremely comfortable and the occupant can lean back somewhat therein.

The seat 40 and the backrest 42 being connected along the edge 46 can also be reenforced by means of a heavy cord or the like 48 in a seam 50, the seam 50 comprising a part of either the rear edge of the seat 40 or the lower edge of the backrest 46 sewed together in any way desired to provide for a strengthening member at this junction. The rear edge of the seat at 40 may be folded over to enclose the bottom edge of the backrest or vice versa.

Figure 4:
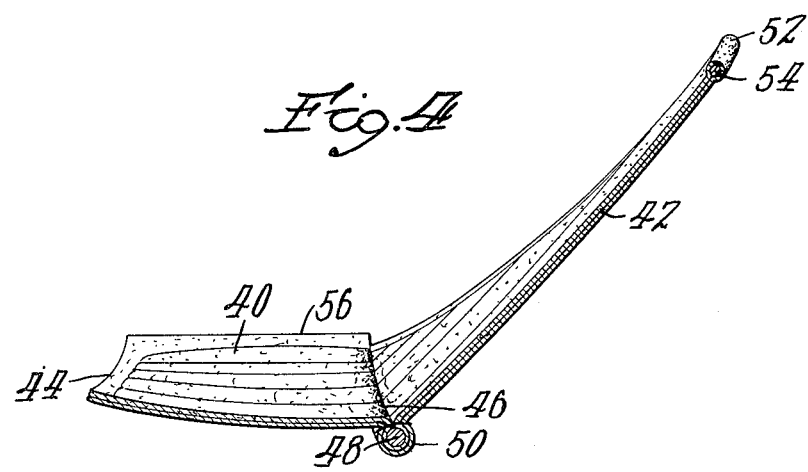
FIG. 4 is a section on line 4—4 of FIG. 3.
Figure 5:
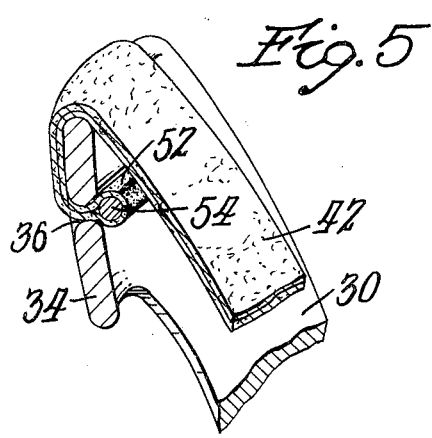
FIG. 5 is an enlarged section on line 5—5 of FIG. 2.
Figure 6:
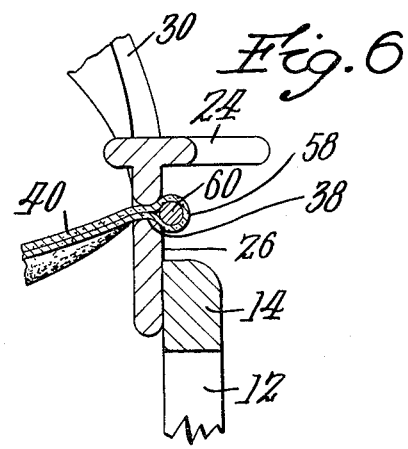
FIG. 6 is an enlarged section on line 6—6 of FIG. 1.

The top end edge of the backrest 42 is provided with a hem 52 which is thrust through the slot 36 (see FIG. 4) at the rear of back 34, and then a dowel or other rod 54 is thrust through the same, the dowel 54 being slightly larger than the slot 36, so that the end of the backrest 42 is firmly held suspended by this means. The dowel or rod 54 is curved to conform to the curvature of the member 34, or if the member 34 should be made straight, then of course the dowel 54 will be straight also.

The lateral edges of the seat 40 are provided with hems 56 and 58 which are similar to that at 52 and are thrust through the slots 38 in the same manner, containing dowels 60 of like nature. In this case the dowels will naturally be straight since the arms 26 and 28 are straight.

It will be seen that a relatively inexpensive and very comfortable chair is provided in which the flexible seat and backrest unit is quickly and easily changeable simply by withdrawing the dowels from the respective hems and reapplying a seat and backrest unit of different fabric, color etc., so that the appearance of the furniture can be changed at will.

The one-piece molded or formed arm and back unit 26, 28, 34, etc. is easily die cut from laminated plywood or died out from sheet metal or the like, and the leg frames and the seat and back, as well as the fabric can be shipped disassembled so as to take up very little volume, and are easily assembled either by the retailer or the ultimate consumer.

Having thus described my invention and the advantages thereof, I do not wish to be limited to the details herein disclosed, otherwise than as set forth in the claims, but what I claim is:

1. A seat construction comprising supporting legs, an arm and back frame comprising a pair of rearwardly extending arm portions which extend at their rear ends upwardly and inwardly toward each other, and a back member connecting the same in elevated position relative to the arm portions, the back member being at the rear of the arm portions, a combined flexible seat and backrest unit mounted on the arm portions and on the back member, the backrest having an upper edge and a lower edge, the seat extending between the arm portions and having end edge portions and connecting side edge portions, one of the side edge portions being free and forming the front edge of the seat and the other side edge portion thereof being connected to the lower edge of the backrest, and means suspending the seat and backrest unit from the frame, said means including interengaging means between the backrest adjacent the upper edge thereof and the back member of the frame and a pair of interengaging means located at the end edge portions of the seat and connecting the same to the arm portions of said frame, so that said combined flexible seat and backrest unit is mounted in free suspended condition from the back member and the two arm portions of the frame, the combined flexible seat and backrest unit being completely flexible throughout except for the interconnecting means on the back of the frame and at the arm portions thereof.

2. The seat construction recited in claim 1 wherein said interengaging means comprises hems at the sides of the seat of the unit and at the upper edge of the backrest, said hems extending through slots in the arm portions and in the backrest, and means in said hems holding the same against retraction through the slots, the means in the hems being removable so that the hems can be retracted through the slots and the unit removed from the arm and back frame.

3. The seat construction recited in claim 1 wherein the line of junction between the backrest and the seat is along a curve which is convex insofar as the seat is concerned and concave complementary thereto at the lower portion of the backrest.

4. The seat construction recited in claim 1 wherein the line of junction between the backrest and the seat is along a curve which is convex insofar as the seat is concerned and concave complementary thereto at the lower portion of the backrest, and flexible means reenforcing the seat and backrest at the junction thereof, said means underlying the seat.

5. The seat construction recited in claim 1 wherein the upwardly and inwardly extending portions of the arm portions and the back member adjacent thereto are formed on curves, said flexible backrest member having side edges terminating short of said upwardly and inwardly extending arm portions leaving gaps therebetween.

6. The seat construction recited in claim 1 wherein the seat and backrest are interconnected at the rear edge of the seat and lower edge of the backrest along a curved line that is convex relative to the seat.

7. The seat construction recited in claim 1 wherein the seat and backrest are interconnected at the rear edge of the seat and lower edge of the backrest along a curved line that is convex relative to the seat and concave relative to the backrest.

References Cited by the Examiner

UNITED STATES PATENTS

| 2,606,601 | 8/52 | Saarinen | 297—418 |
| 2,897,880 | 8/59 | Panicci | 297—446 |
| 3,041,109 | 6/62 | Eames et al. | 297—449 |
| 3,087,758 | 4/63 | Deaton | 297—445 |
| 3,114,577 | 12/63 | Propst | 297—445 |
| 3,117,819 | 1/64 | Kudriavetz | 297—452 |
| 3,124,390 | 3/64 | Eames et al. | 297—452 |

FOREIGN PATENTS

| 1,136,531 | 12/59 | France. |
| 160,473 | 9/57 | Sweden. |

FRANK B. SHERRY, *Primary Examiner.*